Patented May 3, 1938

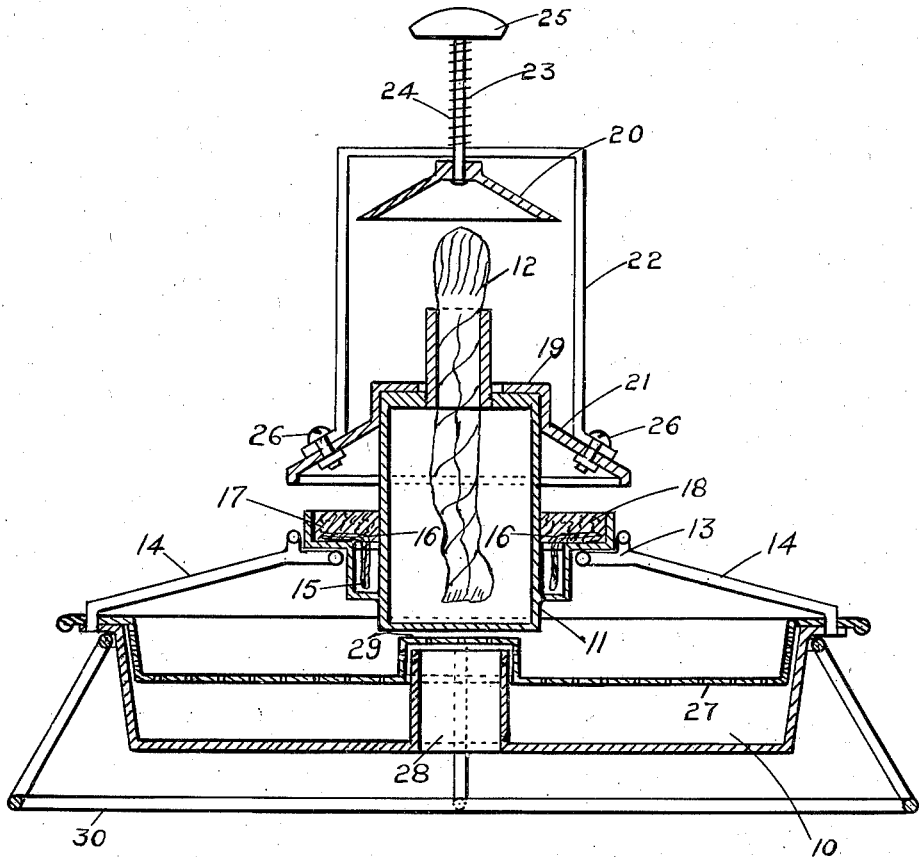

2,116,092

UNITED STATES PATENT OFFICE 2,116,092

INSECT TRAPPING AND EXTERMINATING DEVICE

Lewin J. Allen, Cleveland, Ohio

Application June 21, 1937, Serial No. 149,452

5 Claims. (Cl. 43—113)

The invention in its broadest aspect relates to an Insecta trapping and exterminating device in which an artificial light is used as a principal means. Other ancillary attractants, organic or inorganic, may be incorporated in, and utilized as a constituent in the device for further attracting the insect to insecticides by means of which they may be exterminated.

The Insecta comprises a large division of invertebrated animals to which different limits have been assigned, with Linneaus, a class divided into eight orders: Coleoptera, Hemiptera, Lepidoptera, Neuroptera, Hymenoptera, Diptera and Aptera. The last of these orders include crustaceans and arochnidans, so that in this sense Insecta corresponds to the Cuvierian Articulata, the Latrellean Condylopada, or modern Arthropoda, one of the main branches of the animal kingdom, hence the necessity for various attractants, baits and insecticidal preparations to destroy insects, especially in severe infestations of an economic nature.

One object of this invention is to produce a device which is very simple in design and construction yet highly efficient in use.

Other objects and advantages and the manner in which the various objects are attained reside in the specific construction and arrangement of the elements peculiar to this structure, as will become more apparent from a complete examination of the specification, in the claims of which there are assembled certain specific combinations of parts and specific constructions indicative of the scope and spirit of the invention.

In the accompanying drawing is shown an example of the invention, the figure being a central vertical section.

The embodiment of the invention chosen for the purpose of illustration comprises a fluid container 10, adapted to contain a miscible liquid insect destroying agent or agents, or petroleum and water. Supported in or on the container there is provided a receptacle 11 having a wick 12 therein. This receptacle is adapted to contain a hydrocarbon oil. The wick when lighted produces a flame, and hence a light source is provided in the well known manner.

The support 13 for the light source comprises a plurality of spaced connected and radially extending members 14, mounted in or on the fluid container. The light source is held against accidental displacement when mounted therein or thereon.

Around the light source there may be provided a reservoir 15, adapted to contain an insecticide or an attractant. The reservoir may be provided with a plurality of wicks 16, 16 that reach down into the insecticide if a liquid is used therein. A surrounding confine 17, surrounds the reservoir, and this confine is adapted to hold and maintain an impregnated fibrous or woven fabric or cakelike material attractant or insecticide 18 either natural or synthetic or a combination of both. The fibrous or other suitable material is superimposed upon the wicks, the wicks functioning to feed the liquid insecticide or attractant to the material in the surrounding confine automatically. This construction provides a means whereby the insecticide or attractant cannot be expelled easily by the action of heat and ageing.

On the receptacle there is provided a centering means 19, to ensure vertical positioning and registering location of a snuffer 20, and a canopy 21, which is removably mounted. The centering means is so constructed that its easy and convenient removability from the receptacle is apparent. The canopy is sufficiently wide to extend beyond the surrounding confine, thereby providing a means to partly shield the contents of the reservoir and surrounding confine from solar heat and rain.

On the canopy there is removably supported and maintained a spaced inverted U shaped straddling supporting member 22 having the snuffer mounted therein, and held normally above the flame by means of a helical spring 23 that surrounds a spindle shaft 24 on an end of which the snuffer is mounted. The snuffer is adapted to smother the flame. The smothering or snuffer device is actuated manually by pressing the handle 25 downwardly and holding the device long enough over the flame to bring about a smotheration thereof. The snuffer also acts as a means to shield the wick from solar heat and rain, thereby partly preventing volatilization of the oil and saturation of the wick by rain. The snuffer may be removed from the canopy by removing the bolts and nuts 26, 26. The canopy also assists in gravitating the insects into the container 10, or onto the earth, if the lamp or light source is used independently without the liquid container which is obvious.

In the liquid container 10 there may be provided a foraminous or wire screen member 27 so fashioned that when positioned in the container its submergence is slightly below the surface of the liquid therein contained. This member prevents the destroyed insects sinking to the bottom of the container. It may also be fashioned so as to screen an overflow 28 provided in the container as at 29. This member is provided to permit the liquid to be drained back into the container on its removal, leaving the insects deposited on the screen or foraminous member, from which in turn they may be removed before replacing the member back in the container and the liquid.

The container may be supported in a removably mounted open frame 30 adapted to suspend the device in space above the earth or a foundation, so that the overflow will have ample space to flow therebeneath, and also allow the insects to enter thereunder where they may come into contact with the overflow which contains pernicious properties that tend to destroy them.

The snuffer and canopy may be removed and the device used as a smudge lamp in frosty weather, in groves and the like. Obviously the device may be supported on or in a bracket secured to a suitable upright.

Since the operation of the various instrumentalities and their purpose have been described, in connection with the description thereof, it is believed that a résumé of the operation of the device is unnecessary.

While I have shown and described one embodiment of the invention it will be understood that this has been chosen for the purpose of illustration only, and that I do not desire to be limited to the details of construction shown and described, for obvious modifications will occur to persons skilled in the art.

Having thus fully described my invention, what I claim as new and desire to secure by Letters Patent is:—

1. In an insect trap of the class described having a receptacle provided with a wick therein, a reservoir immediately surrounding the receptacle adapted to contain a liquid insecticide, a surrounding confine surrounding the reservoir, a fibrous material adapted to conform to the surrounding confine, wicks in the surrounding confine and communicating with the liquid insecticide in the reservoir, the fibrous material being superimposed upon the wicks, the wicks functioning to feed the liquid insecticide into the fibrous material automatically, a fluid container, a support mounted on the fluid container adapted to support the receptacle, and a base for supporting the container in space.

2. In an insect trap of the class described having a receptacle provided with a wick therein, a surrounding confine surrounding the receptacle, a fibrous material impregnated with an insecticide mounted in the surrounding confine, a fluid container, a support mounted on the fluid container adapted to support the receptacle, and a base for supporting the container in space.

3. In an insect trap of the class described having a receptacle provided with a wick therein, a reservoir immediately surrounding the receptacle, a surrounding confine, a plurality of wicks, the wicks spaced around the receptacle and extending into the confine and fed by an insecticide in the reservoir, a miscible fluid container, a support mounted on the container adapted to support the receptacle and a base for supporting the container in space.

4. In an insect trap of the class described having a liquid container, a receptacle provided with a wick therein, a removably mounted canopy on the receptacle adapted to gravitate destroyed insects into the liquid container below, a supporting member for the receptacle, the supporting member being removably mounted on the container, and a base member adapted to support the container in space.

5. In a device of the character described, the combination of a receptacle provided with a wick, and normally filled with hydrocarbon oil, a reservoir immediately surrounding the receptacle adapted to contain a liquid insecticide, a surrounding confine surrounding the reservoir, a fibrous material adapted to conform to the surrounding confine, wicks in the surrounding confine and communicating with the liquid insecticide in the reservoir, the fibrous material being superimposed upon the wicks, the wicks functioning to feed the liquid insecticide into the fibrous material automatically, a fluid container, an overflow, the overflow positioned in the fluid container, a submerged foraminous member removably mounted in the container, having a portion thereof screening the overflow, a supporting member removably mounted on the container adapted to support the receptacle thereon, a canopy, a snuffer, the canopy being removably supported on the receptacle, and the snuffer being removably mounted on the canopy, a helical spring adapted to normally maintain the snuffer inactive above the wick in the receptacle, and a removably mounted base adapted to support the device in space above a horizontal plane.

LEWIN J. ALLEN.